United States Patent
Noguchi et al.

(10) Patent No.: US 10,985,914 B2
(45) Date of Patent: Apr. 20, 2021

(54) KEY GENERATION DEVICE AND KEY GENERATION METHOD

(71) Applicant: FUJITSU LIMITED, Kawasaki (JP)

(72) Inventors: Yasuo Noguchi, Kawasaki (JP); Takeshi Shimoyama, Shinagawa (JP)

(73) Assignee: FUJITSU LIMITED, Kawasaki (JP)

( * ) Notice: Subject to any disclaimer, the term of this patent is extended or adjusted under 35 U.S.C. 154(b) by 354 days.

(21) Appl. No.: 15/911,860

(22) Filed: Mar. 5, 2018

(65) Prior Publication Data
US 2018/0262331 A1 Sep. 13, 2018

(30) Foreign Application Priority Data
Mar. 7, 2017 (JP) .............................. JP2017-042340

(51) Int. Cl.
*H04L 29/06* (2006.01)
*H04L 9/08* (2006.01)
(Continued)

(52) U.S. Cl.
CPC .......... *H04L 9/0866* (2013.01); *H04L 9/0662* (2013.01); *H04L 9/0869* (2013.01);
(Continued)

(58) Field of Classification Search
CPC ........................ H04L 9/0866; H04L 9/0869
See application file for complete search history.

(56) References Cited

U.S. PATENT DOCUMENTS 7,802,151 B1 * 9/2010 Sutardja ................ H04L 1/0054
714/701
9,703,989 B1 * 7/2017 Pedersen ............... H04L 9/0894
(Continued)

FOREIGN PATENT DOCUMENTS

JP 2002-538504 11/2002
WO WO 00/51244 8/2000
(Continued)

OTHER PUBLICATIONS

Shin, SeongHan; Kobara, Kazukuni; "Key Establishment Using Physically Unclonable Functions", International Conference on Computational Science and Computational Intelligence (CSCI), IEEE, Dec. 7-9, 2015, pp. 352-355.*
(Continued)

*Primary Examiner* — Victor Lesniewski
(74) *Attorney, Agent, or Firm* — Staas & Halsey LLP

(57) ABSTRACT

A key generation device includes a generation circuit, a concealment processing unit, and a cryptography processing unit. The generation circuit generates a value dependent on hardware. When acquiring a concealed cryptographic key, the concealment processing unit generates first data by performing a mask process to the concealed cryptographic key by using the value generated by the generation circuit, generates second data by decoding the first data by a first error correction decoding method, and generates a cryptographic key by decoding the second data by a second error correction decoding method. When acquiring the concealed cryptographic key and a plain text or an encrypted text, the cryptography processing unit acquires the cryptographic key corresponding to the concealed cryptographic key from the concealment processing unit, and encrypts the plain text or decrypts the encrypted text by using the cryptographic key.

3 Claims, 10 Drawing Sheets

(51) Int. Cl.
*H04L 9/06* (2006.01)
*H03M 13/19* (2006.01)
*H03M 13/11* (2006.01)
*H03M 13/15* (2006.01)
*H03M 13/23* (2006.01)

(52) U.S. Cl.
CPC ...... *H03M 13/1102* (2013.01); *H03M 13/152* (2013.01); *H03M 13/1515* (2013.01); *H03M 13/19* (2013.01); *H03M 13/23* (2013.01); *H04L 2209/04* (2013.01); *H04L 2209/34* (2013.01)

(56) References Cited

U.S. PATENT DOCUMENTS

| | | | |
|---|---|---|---|
| 9,882,720 B1* | 1/2018 | Levy | H04L 9/3247 |
| 2009/0193319 A1* | 7/2009 | Shen | G06F 11/10 |
| | | | 714/777 |
| 2012/0183135 A1* | 7/2012 | Paral | H04L 9/0866 |
| | | | 380/44 |
| 2013/0051552 A1* | 2/2013 | Handschuh | H04L 9/0866 |
| | | | 380/44 |
| 2013/0174243 A1 | 7/2013 | Inatomi et al. | |
| 2013/0254636 A1* | 9/2013 | Kirkpatrick | H04L 9/0866 |
| | | | 714/784 |
| 2014/0089685 A1 | 3/2014 | Suzuki | |
| 2014/0325237 A1* | 10/2014 | Van Der Leest | H04L 9/0866 |
| | | | 713/189 |
| 2015/0149873 A1* | 5/2015 | Cai | H03M 13/458 |
| | | | 714/773 |
| 2015/0188707 A1* | 7/2015 | Gehrer | H04L 9/3006 |
| | | | 380/30 |
| 2015/0234751 A1* | 8/2015 | Van Der Sluis | H04L 9/3278 |
| | | | 713/193 |
| 2016/0006570 A1* | 1/2016 | Falk | H04L 9/0866 |
| | | | 380/44 |
| 2016/0156476 A1* | 6/2016 | Lee | H04L 9/088 |
| | | | 380/44 |
| 2017/0104590 A1* | 4/2017 | Wang | H04L 9/304 |
| 2017/0149572 A1* | 5/2017 | Wallrabenstein | G06F 21/34 |
| 2017/0242660 A1* | 8/2017 | Katoh | H04L 9/003 |
| 2017/0288869 A1* | 10/2017 | Li | H04L 9/0861 |
| 2018/0004444 A1* | 1/2018 | Murray | G06F 3/0629 |
| 2018/0234258 A1* | 8/2018 | Peffers | G06F 1/04 |
| 2018/0241557 A1* | 8/2018 | Maes | H03M 13/6356 |

FOREIGN PATENT DOCUMENTS

| | | |
|---|---|---|
| WO | WO 2006/093238 A1 | 9/2006 |
| WO | WO 2012/042775 A1 | 4/2012 |
| WO | WO2012/164721 | 12/2012 |

OTHER PUBLICATIONS

Becker, Georg T.; Wild, Alexander; Guneysu, Tim; "Security Analysis of Index-Based Syndrome Coding for PUF-Based Key Generation", International Symposium on Hardware Oriented Security and Trust (HOST), IEEE, May 5-7, 2015, pp. 20-25.*
Espacenet English abstract for Japanese Patent Publication No. 2002-538504, published Nov. 12, 2002.
Ari Juels et al., "A Fuzzy Commitment Scheme", Proceedings of the 6th ACM conference on Computer and Communications Security, Nov. 1-4, 1999, pp. 28-36.
Japanese Office Action dated Nov. 10, 2020 from Japanese Application No. 2017-042340, 7 pages.

\* cited by examiner

KEY GENERATION DEVICE AND KEY GENERATION METHOD

CROSS-REFERENCE TO RELATED APPLICATION

This application is based upon and claims the benefit of priority of the prior Japanese Patent Application No. 2017-042340, filed on Mar. 7, 2017, the entire contents of which are incorporated herein by reference.

FIELD

The embodiments discussed herein relate to a key generation device and a key generation method.

BACKGROUND

Data is sometimes stored in an encrypted state, to allow a user having a predetermined access right to view the data and to prevent a user not having the access right from viewing the data. For example, business secret data that is not to be disclosed to the outside of an organization is sometimes stored in an encrypted state, to protect the business secret data from security attack, such as targeted attack and internal crime. However, if a cryptographic key used in cryptography processing, such as a symmetric key of symmetric key cryptography, is not managed appropriately, there is a security risk that the cryptographic key is stolen by a user not having an access right and that the encrypted data is decrypted and leaked fraudulently.

With regard to cryptography processing technology, there is a biometric authentication technology that enables data processing on the basis of a physical feature, such as fingerprint, vein, and iris, or a behavioral feature, such as handwriting. Fuzzy commitment is proposed as a biometric authentication technology. In the fuzzy commitment, biometric information to be stored is masked on the basis of secret information, such as a password, and the mask data and a hash value of the secret information are stored in a database. Thereafter, the secret information is restored by using biometric information to be verified and the mask data stored in the database, and a hash value of the restored secret information and the hash value stored in the database are compared to determine whether the authentication is a success or failure.

A fuzzy commitment method that generates a fuzzy commitment on the basis of a pattern input by a user is proposed as a biometric authentication technique. Also, there is proposed an authentication device capable of protecting a biometric authentication template stored in a database. Also, there is proposed a biometric authentication system capable of preventing impersonation attack even when a template and key information are leaked.

See, for example, International Publication Pamphlet Nos. WO 00/51244, WO 2006/093238, and WO 2012/042775.

See also Ari Juels and Martin Wattenberg, "A fuzzy commitment scheme", Proceedings of the 6th ACM (Association for Computing Machinery) conference on Computer and Communications Security, pp. 28-36, 1999.

By the way, a method of storing a cryptographic key in a concealed state by using other information, such as storing a cryptographic key itself in an encrypted state by using another cryptographic key, is conceived as a method for reducing the risk of leaking the cryptographic key. However, if the information used to conceal the cryptographic key is not protected sufficiently, there is a risk that the concealment of the cryptographic key is cancelled fraudulently. Further, if the concealment of the cryptographic key is temporarily cancelled on various devices, such as a terminal device of a user, in order to use the cryptographic key, there is a risk that the cryptographic key is leaked when the concealment is cancelled.

SUMMARY

According to one aspect, there is provided a key generation device including: a generation circuit configured to generate a value dependent on hardware; a concealment processing unit configured to, when acquiring a concealed cryptographic key, generate first data by performing a mask process to the concealed cryptographic key by using the value generated by the generation circuit, generate second data by decoding the first data by a first error correction decoding method, and generate a cryptographic key by decoding the second data by a second error correction decoding method; and a cryptography processing unit configured to, when acquiring the concealed cryptographic key and a plain text or an encrypted text, acquire the cryptographic key corresponding to the concealed cryptographic key from the concealment processing unit, and encrypt the plain text or decrypt the encrypted text by using the cryptographic key.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Figure 1:
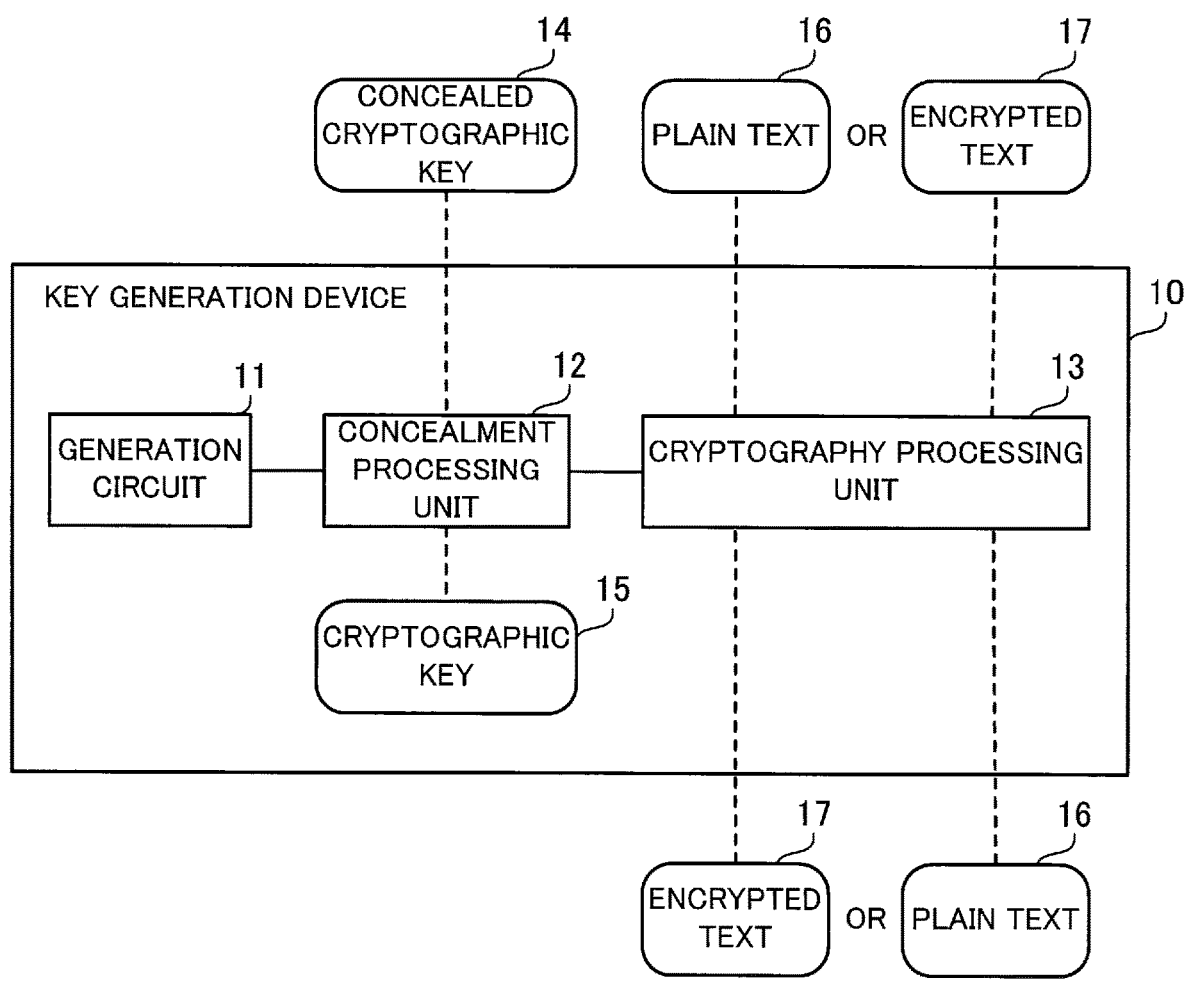
FIG. 1 illustrates an example of a key generation device of a first embodiment.

Several embodiments will be described below with reference to the accompanying drawings, wherein like reference numerals refer to like elements throughout.

First Embodiment

A first embodiment will be described. FIG. 1 illustrates an example of a key generation device of the first embodiment.

A key generation device 10 of the first embodiment is a security device that reduces the risk of leaking a cryptographic key. The key generation device 10 may be provided in a computer. Also, the key generation device 10 may be provided in a client device and may be provided in a server apparatus. The key generation device 10 is implemented by using an electronic circuit, such as an application specific integrated circuit (ASIC) and a field programmable gate array (FPGA), for example. The key generation device 10 includes a generation circuit 11, a concealment processing unit 12, and a cryptography processing unit 13.

The generation circuit 11 generates a value dependent on the hardware of the generation circuit 11. For example, the generation circuit 11 generates a physical unclonable function (PUF) value that varies depending on individual difference originating in its production, such as impurity density. The difference of the PUF value may depend on a slight difference of a time point at which an output signal changes in response to a change of an input signal, a difference of an initial value of a memory immediately after a power supply is turned on, or the like. Thus, it is difficult to duplicate the generation circuit 11. Even if another key generation device of the same type as the key generation device 10 is built, a generation circuit of the other key generation device generates a different value from the generation circuit 11 of the key generation device 10. A value significantly different from the generation circuit of the other key generation device is generated by increasing the number of digits of the value (for example, the number of bits of a binary number) generated by the generation circuit 11.

Values generated by the generation circuit 11 are substantially stable in uniqueness of the generation circuit 11. However, the generation circuit 11 generates the values by utilizing a slight difference originating in its production, and thus it is possible that the values are not always constant but vary within a certain range. For example, the values generated by the generation circuit 11 may slightly change depending on the operation environment of the key generation device 10, such as air temperature around the key generation device 10. The difference among the generated values appear in a sufficiently small number of digits (for example, a sufficiently small number of bits) and thus is supposed to be distinguishable from a value generated by a generation circuit of another key generation device.

The value generated by the generation circuit is readable from the inside of the key generation device 10, such as the concealment processing unit 12, but is difficult to read from the outside of the key generation device 10. That is, the value generated by the generation circuit 11 is protected physically, thereby reducing the leakage risk. Note that the generation circuit 11 may be included in the concealment processing unit 12.

The concealment processing unit 12 acquires a concealed cryptographic key 14 from the cryptography processing unit 13. The concealed cryptographic key 14 is obtained by concealing a cryptographic key 15. It is difficult to restore the cryptographic key 15 from the concealed cryptographic key 14 without using the value generated by the generation circuit 11. The generating method of the concealed cryptographic key 14 will be described later. When acquiring the concealed cryptographic key 14, the concealment processing unit 12 acquires the value generated by the generation circuit 11, from the generation circuit 11. The concealment processing unit 12 restores the cryptographic key 15 from the value generated by the generation circuit 11 and the concealed cryptographic key 14, as described in the following.

First, the concealment processing unit 12 performs a mask process to the concealed cryptographic key 14 by using the value generated by the generation circuit 11, in order to generate first data as a result of the mask process. This mask process is logical operation for calculating an exclusive logical OR of each bit between the value generated by the generation circuit 11 and the concealed cryptographic key 14, for example. Next, the concealment processing unit 12 performs error correction decoding to the first data by a first error correction decoding method, in order to generate second data as a result of the first error correction decoding method. Then, the concealment processing unit 12 performs error correction decoding to the second data by a second error correction decoding method, in order to generate the cryptographic key 15 as a result of the second error correction decoding method. The concealment processing unit 12 supplies the restored cryptographic key 15 to the cryptography processing unit 13, without outputting the restored cryptographic key 15 to the outside.

The concealed cryptographic key 14 is dependent on the value generated by the generation circuit 11, and thus a device other than the key generation device 10 is unable to restore the cryptographic key 15 correctly. The concealed cryptographic key 14 is generated by the concealment processing unit 12, as described in the following, for example.

First, when acquiring the cryptographic key 15, the concealment processing unit 12 performs error correction encoding to the cryptographic key 15 by a second error correction encoding method, in order to generate third data as a result of the second error correction encoding method. The second error correction encoding method corresponds to the aforementioned second error correction decoding method. Next, the concealment processing unit 12 generates a random number and performs a mask process to the third data by using the generated random number, in order to generate fourth data as a result of the mask process. This mask process is logical operation for calculating an exclusive logical OR of each bit between the random number and the third data, for example.

Next, the concealment processing unit 12 performs error correction encoding to the fourth data by a first error correction encoding method, in order to generate fifth data as a result of the first error correction encoding method. The first error correction encoding method corresponds to the aforementioned first error correction decoding method. Then, the concealment processing unit 12 performs a mask process to the fifth data by using the value generated by the generation circuit 11, in order to generate the concealed cryptographic key 14 as a result of the mask process. This mask process is logical operation for calculating an exclusive logical OR of each bit between the value generated by the generation circuit 11 and the fifth data, for example. The concealment processing unit 12 outputs the generated concealed cryptographic key 14 to the outside.

The first error correction encoding method and the second error correction encoding method may employ the same encoding algorithm, and may employ different encoding algorithms. Likewise, the first error correction decoding method and the second error correction decoding method may employ the same decode algorithm, and may employ different decode algorithms. The Hamming weight of the above random number is preferably equal to or smaller than the error correction capability of the second error correction decoding method. The Hamming weight of the value generated by the generation circuit 11 preferably exceeds the error correction capability of the first error correction decoding method.

The difference between the value generated by the generation circuit 11 to generate the concealed cryptographic key 14 and the value generated by the generation circuit 11 to restore the cryptographic key 15, that is, the Hamming weight of the change of the value generated by the generation circuit 11 is preferably equal to or smaller than the error correction capability of the first error correction decoding method. The Hamming weight is the number of digits having a value other than "0", such as the number of bits "1" of a binary number. The error correction capability may also be referred to as the number of correctable bits and the number of correctable digits.

In this case, the mask process is performed to the concealed cryptographic key 14 by using the value generated by the generation circuit 11, and the value generated by the generation circuit 11 is difficult to read from the outside of the key generation device 10. Thus, it is difficult to restore the cryptographic key 15 from the concealed cryptographic key 14 by a device other than the key generation device 10. In addition, the mask process is performed to the concealed cryptographic key 14 by using the random number, and thus even if the cryptographic key 15 is leaked, it is difficult to guess the value generated by the generation circuit 11. In addition, fluctuation of the value generated by the generation circuit 11 is removed by the first error correction decoding method, and the random number is removed by the second error correction decoding method, in order to correctly restore the cryptographic key 15.

The cryptography processing unit 13 acquires the concealed cryptographic key 14 as well as a plain text or an encrypted text 17. Then, the cryptography processing unit 13 supplies the concealed cryptographic key 14 to the concealment processing unit 12 and acquires the cryptographic key 15 from the concealment processing unit 12. The cryptography processing unit 13 encrypts the plain text 16 by using the cryptographic key 15 to generate the encrypted text 17 and outputs the encrypted text 17 to the outside. Alternatively, the cryptography processing unit 13 decrypts the encrypted text 17 by using the cryptographic key 15 to generate the plain text 16 and outputs the plain text 16 to the outside. It is preferable that the cryptography processing unit 13 discards the cryptographic key 15, when cryptography processing, such as encrypting and decrypting, is finished. That is, the concealed cryptographic key 14 is input from the outside during each cryptography processing, and the cryptographic key 15 is temporarily restored inside the key generation device 10 during each cryptography processing.

A symmetric key of symmetric key cryptography is used as the cryptographic key 15, for example. The cryptography processing unit 13 encrypts the plain text 16 or decrypts the encrypted text 17 by a predetermined symmetric key cryptography, such as the advanced encryption standard (AES). However, it is also conceived that a private key of public key cryptography is protected by the above method. In that case, the cryptography processing unit 13 decrypts the encrypted text 17 by a predetermined public key cryptography, by using the private key as the cryptographic key 15.

In the key generation device 10 of the first embodiment, the concealed cryptographic key 14 is generated by using the value generated by the generation circuit 11, which is difficult to read from the outside, and the cryptographic key 15 is temporarily restored from the concealed cryptographic key 14 inside the key generation device 10 at the time of the cryptography processing. Thus, the risk of leaking the cryptographic key 15 is reduced, and the protection of the cryptographic key 15 is enhanced. As a result, the security of the encrypted text 17 that may be decrypted by using the cryptographic key 15 is enhanced, and the risk of leaking the plain text 16 is reduced.

Second Embodiment

Figure 2:
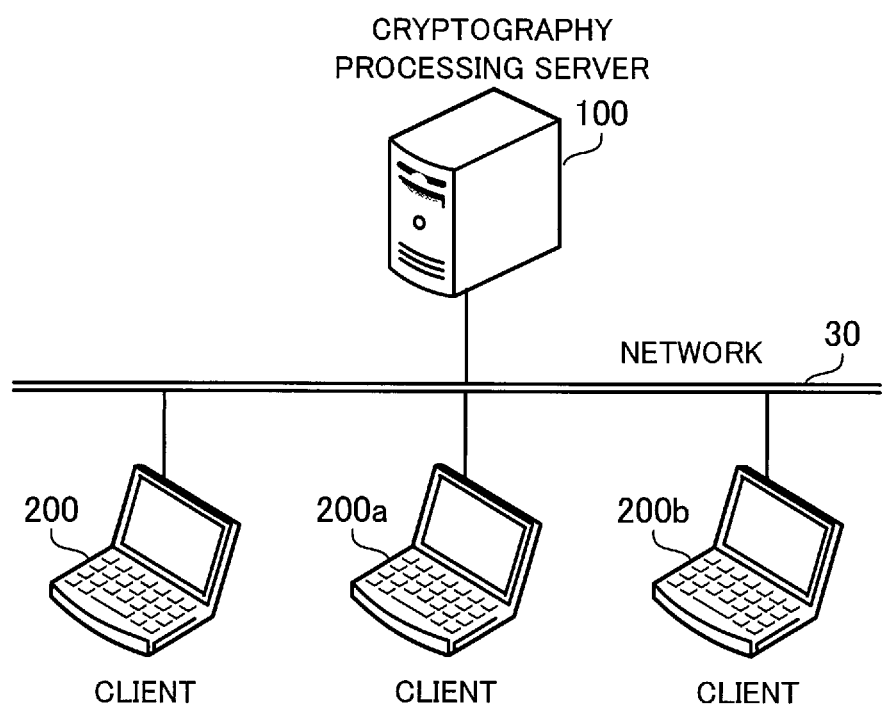
FIG. 2 illustrates an example of an information processing system of a second embodiment.

Next, a second embodiment will be described. FIG. 2 illustrates an example of an information processing system of the second embodiment.

In the information processing system of the second embodiment, a specific server apparatus exclusively performs cryptography processing, such as protection of a cryptographic key, encryption of a plain text, and decryption of an encrypted text, in order to improve information security. This information processing system includes a cryptography processing server 100 and clients 200, 200a, and 200b. The cryptography processing server 100 and the clients 200, 200a, and 200b are connected to a network 30. The network 30 is an intra-organization network, such as a local area network (LAN), for example.

The cryptography processing server 100 is a server computer that performs cryptography processing. The cryptography processing server 100 receives a cryptographic key from the clients 200, 200a, and 200b, conceals the received cryptographic key, and returns the concealed cryptographic key. Also, the cryptography processing server 100 receives a plain text and a concealed cryptographic key from the clients 200, 200a, and 200b, restores a cryptographic key from the received concealed cryptographic key, encrypts the plain text by using the restored cryptographic key, and returns the encrypted text.

Also, the cryptography processing server 100 receives an encrypted text and a concealed cryptographic key from the clients 200, 200a, and 200b, restores a cryptographic key from the received concealed cryptographic key, decrypts the encrypted text by using the restored cryptographic key, and returns the plain text. Also, the cryptography processing server 100 receives a previous encrypted text, a previous concealed cryptographic key, and a new concealed cryptographic key from the clients 200, 200a, and 200b, decrypts the previous encrypted text on the basis of the previous concealed cryptographic key, re-encrypts the plain text on the basis of the new concealed cryptographic key, and returns the new encrypted text. The cryptographic key restored temporarily inside the cryptography processing server 100 is not supplied to the clients 200, 200a, and 200b.

The clients 200, 200a, and 200b are client computers as terminal devices operated by users. The cryptography processing server 100 and the clients 200, 200a, and 200b communicate with each other by using a web application programming interface (API). The clients 200, 200a, and 200b transmit a cryptographic key to the cryptography processing server 100 and receive a concealed cryptographic key from the cryptography processing server 100. It is preferable that the clients 200, 200a, and 200b retain the concealed cryptographic key, not the original cryptographic key.

When data is to be stored in an encrypted state, the clients 200, 200a, and 200b transmit a plain text (unencrypted data) and a concealed cryptographic key to the cryptography processing server 100 and receives an encrypted text (encrypted data) corresponding to the plain text from the cryptography processing server 100. It is preferable that the clients 200, 200a, and 200b retain the encrypted text, not the plain text. When encrypted data is to be viewed, the clients 200, 200a, and 200b transmit an encrypted text and a concealed cryptographic key to the cryptography processing server 100 and receives a plain text corresponding to the encrypted text from the cryptography processing server 100.

Note that, when a cryptographic key is to be concealed, the cryptography processing server 100 may read the cryptographic key offline, instead of transmitting the cryptographic key to the cryptography processing server 100 via the network 30. For example, a cryptographic key may be recorded in a portable storage medium and be read into the cryptography processing server 100 from the portable storage medium. Also, a user may input a cryptographic key into the cryptography processing server 100 by using an input device. Likewise, the concealed cryptographic key may be read into the clients 200, 200a, and 200b offline, instead of transmitting the concealed cryptographic key to the clients 200, 200a, and 200b via the network 30.

Figure 3:
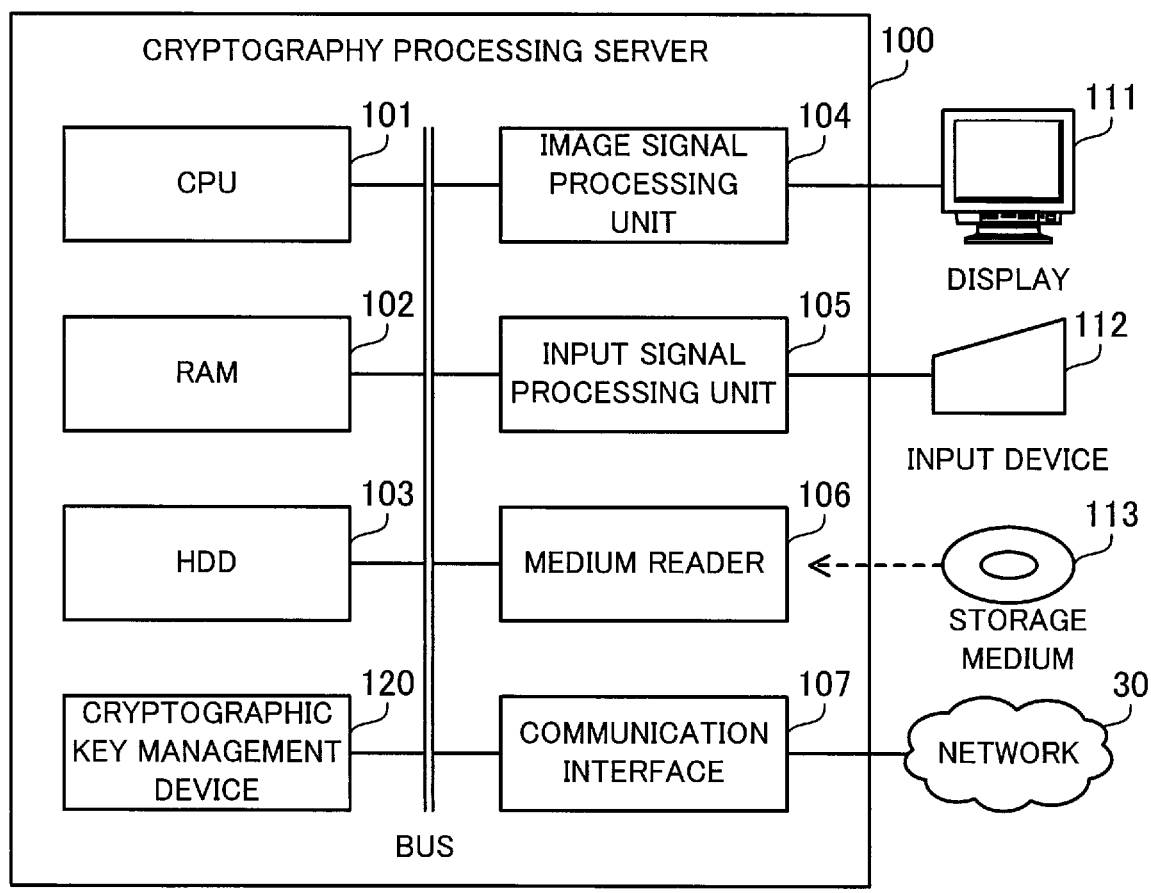
FIG. 3 is a block diagram illustrating a hardware example of a cryptography processing server.

FIG. 3 is a block diagram illustrating a hardware example of the cryptography processing server. The cryptography processing server 100 includes a central processing unit (CPU) 101, a random access memory (RAM) 102, a hard disk drive (HDD) 103, an image signal processing unit 104, an input signal processing unit 105, a medium reader 106, and a communication interface 107. In addition, the cryptography processing server 100 includes a cryptographic key management device 120. The cryptographic key management device 120 corresponds to the key generation device 10 of the first embodiment. These units are connected to a bus. The clients 200, 200a, and 200b may be implemented by using the same hardware as the cryptography processing server 100. However, the clients 200, 200a, and 200b do not need to include the cryptographic key management device 120.

The CPU 101 is a processor including a computing circuit that executes commands of programs. The CPU 101 loads at least part of programs and data stored in the HDD 103 into the RAM 102 and executes the programs. Note that the CPU 101 may include a plurality of processor cores, and the cryptography processing server 100 may include a plurality of processors, so that the following process are executed in parallel by using the plurality of processors or processor cores. A group of processors are sometimes referred to as a multiprocessor or simply a processor.

The RAM 102 is a volatile semiconductor memory that temporarily stores programs executed by the CPU 101 and data that the CPU 101 uses in computation. Note that the cryptography processing server 100 may include a memory of a type other than the RAM, and may include a plurality of memories.

The HDD 103 is a non-volatile memory device for storing software programs, such as an operating system (OS) and application software, and data. Note that the cryptography processing server 100 may include a memory device of another type, such as a flash memory and a solid state drive (SSD), and may include a plurality of non-volatile memory devices.

The image signal processing unit 104 outputs an image to a display 111 connected to the cryptography processing server 100, in accordance with a command from the CPU 101. A display of any type, such as a cathode ray tube (CRT) display, a liquid crystal display (LCD), a plasma display, an organic electro-luminescence (OEL) display, may be used as the display 111.

The input signal processing unit 105 acquires an input signal from an input device 112 connected to the cryptography processing server 100 and outputs the input signal to the CPU 101. The input device 112 is, for example, a pointing device such as a mouse, a touch panel, a touch pad, and a trackball, as well as a keyboard, a remote controller, and a button switch. A plurality of types of input devices may be connected to the cryptography processing server 100.

The medium reader 106 is a reader device for reading programs and data stored in a storage medium 113. The storage medium 113 is, for example, a magnetic disk, an optical disc, a magneto-optical disk (MO), a semiconductor memory, or the like. The magnetic disk includes a flexible disk (FD) and an HDD. The optical disc includes a compact disc (CD) and a digital versatile disc (DVD).

For example, the medium reader 106 copies the programs and data read from the storage medium 113, into another storage medium, such as the RAM 102 and the HDD 103. The read programs are executed by the CPU 101, for example. Note that the storage medium 113 may be a portable storage medium, which is used to distribute the programs and data. The storage medium 113 and the HDD 103 are sometimes referred to as computer-readable storage medium.

The communication interface 107 is connected to the network 30, to communicate with other devices via the network 30. The communication interface 107 is a wired communication interface connected by a cable and a communication device, such as a switch, for example. However, the communication interface 107 may be a wireless communication interface connected with a base station by wireless link.

The cryptographic key management device 120 is a hardware security module that performs concealment of a cryptographic key, encryption of a plain text, decrypting of an encrypted text, and re-encryption of an encrypted text. A cryptographic key is protected by preventing the cryptographic key from leaking to the outside of the cryptographic key management device 120 at the time of encryption and decryption. The cryptographic key management device 120 is implemented as an electronic circuit, such as an ASIC and an FPGA.

Figure 4:
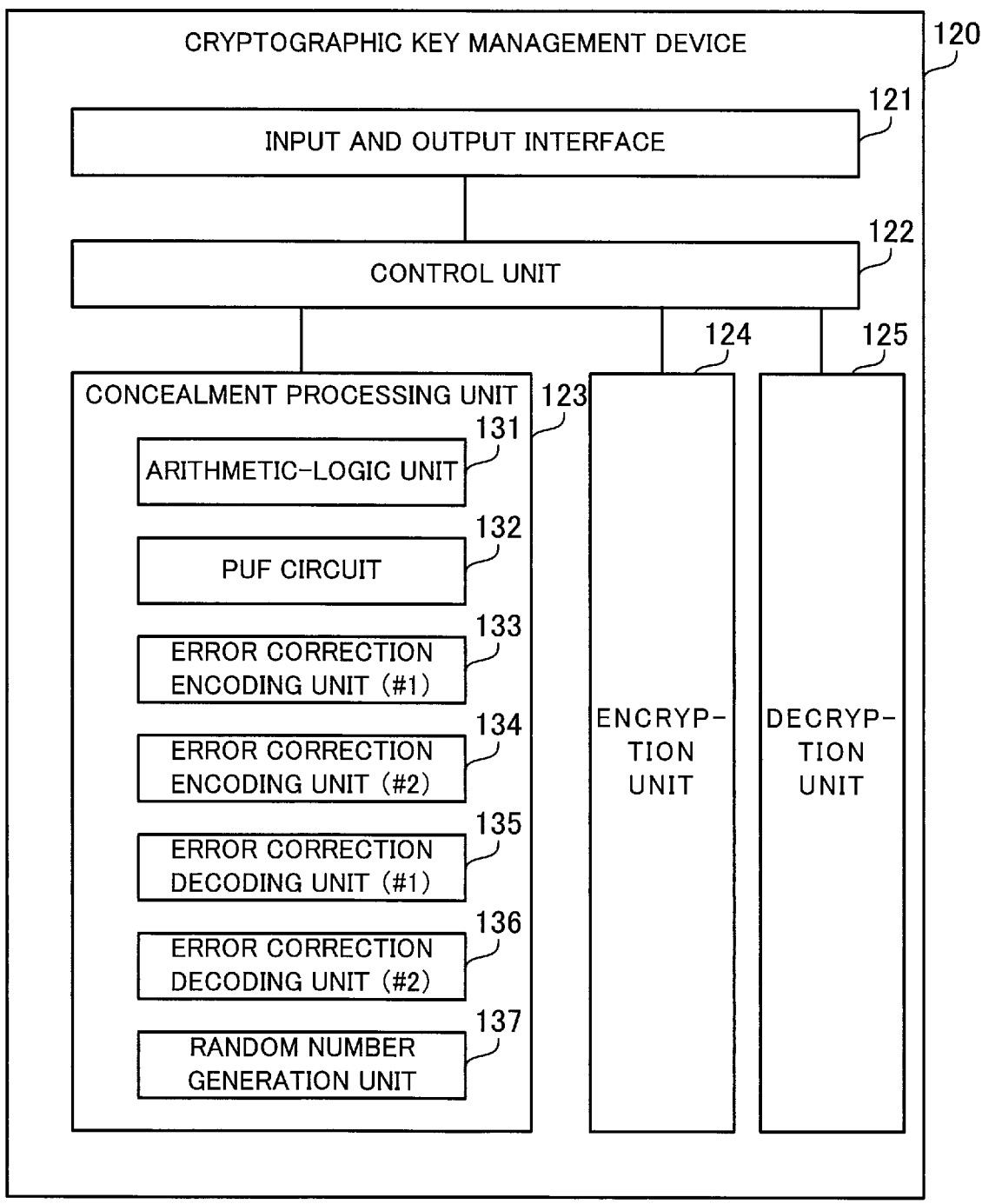
FIG. 4 is a block diagram illustrating a hardware example of a cryptographic key management device.

FIG. 4 is a block diagram illustrating a hardware example of the cryptographic key management device. The cryptographic key management device 120 includes an input and output interface 121, a control unit 122, a concealment processing unit 123, an encryption unit 124, and a decryption unit 125. Note that the concealment processing unit 123 corresponds to the concealment processing unit 12 of the first embodiment. The encryption unit 124 and the decryption unit 125 correspond to the cryptography processing unit 13 of the first embodiment.

The input and output interface 121 accepts a cryptography processing command from the CPU 101 and supplies a cryptography processing result to the CPU 101. The type of the cryptography processing command is, for example, a cryptographic key concealment command, an encryption command, a decryption command, and a re-encryption command. A cryptographic key before concealment is attached to the cryptographic key concealment command. A concealed cryptographic key and a plain text are attached to the encryption command. A concealed cryptographic key and an encrypted text are attached to the decryption command. A previous encrypted text, a previous concealed cryptographic key, and a new concealed cryptographic key are attached to the re-encryption command.

The control unit 122 acquires a cryptography processing command from the input and output interface 121, executes cryptography processing by utilizing the concealment processing unit 123, the encryption unit 124, and the decryption unit 125 and outputs a cryptography processing result to the input and output interface 121.

In response to the cryptographic key concealment command, the control unit 122 inputs the cryptographic key into the concealment processing unit 123 and acquires a concealed cryptographic key from the concealment processing unit 123. In response to the encryption command, the control unit 122 inputs the concealed cryptographic key into the concealment processing unit 123, acquires a cryptographic key from the concealment processing unit 123, inputs the cryptographic key and the plain text into the encryption unit 124, and acquires an encrypted text from the encryption unit 124.

In response to the decryption command, the control unit 122 inputs the concealed cryptographic key into the concealment processing unit 123, acquires a cryptographic key from the concealment processing unit 123, inputs the cryptographic key and the encrypted text into the decryption unit 125, and acquires a plain text from the decryption unit 125. In response to the re-encryption command, the control unit 122 inputs the previous concealed cryptographic key into the concealment processing unit 123, acquires a previous cryptographic key from the concealment processing unit 123, inputs the previous cryptographic key and the previous encrypted text into the decryption unit 125, and acquires a plain text from the decryption unit 125. The control unit 122 inputs the new concealed cryptographic key into the concealment processing unit 123, acquires a new cryptographic key from the concealment processing unit 123, inputs the new cryptographic key and the plain text into the encryption unit 124, and acquires a new encrypted text from the encryption unit 124.

When acquiring a cryptographic key from the control unit 122, the concealment processing unit 123 conceals the cryptographic key and outputs the concealed cryptographic key to the control unit 122. Also, when acquiring a concealed cryptographic key from the control unit 122, the concealment processing unit 123 cancels the concealment of the cryptographic key and outputs the cryptographic key to the control unit 122. The cryptographic key whose concealment is canceled is not output to the outside of the cryptographic key management device 120. Other devices are unable to restore the cryptographic key from the concealed cryptographic key generated by the cryptographic key management device 120, as described below. Also, the cryptographic key management device 120 is unable to restore a cryptographic key from a concealed cryptographic key generated by other devices, as described below.

The concealment processing unit 123 includes an arithmetic-logic unit 131, a PUF circuit 132, error correction encoding units 133 and 134, error correction decoding units 135 and 136, and a random number generation unit 137. Note that the PUF circuit 132 corresponds to the generation circuit 11 of the first embodiment.

The arithmetic-logic unit 131 is used to generate a concealed cryptographic key and to restore a cryptographic key. The arithmetic-logic unit 131 performs a mask process to data. Specifically, the arithmetic-logic unit 131 executes logical operation to calculate an exclusive logical OR for each bit between two-bit sequences.

The PUF circuit 132 is an electronic circuit for generating a PUF code, which is a value unique to hardware, by utilizing the PUF. The PUF circuit 132 is used to generate a concealed cryptographic key and to restore a cryptographic key. The PUF code is dependent on individual difference of hardware that occurs inevitably during production, such as impurity density. Hence, it is difficult to duplicate the PUF circuit 132 that generates the same PUF code, and the PUF code generated by the PUF circuit 132 is sufficiently different from the PUF codes of other cryptographic key management devices. The PUF code generated by the PUF circuit 132 does not change largely, but does not always become a constant value, and sometimes fluctuates within a certain range. The PUF code changes in a sufficiently smaller number of bits than the length (the number of all bits) of the PUF code. The PUF code is physically protected and is difficult to read from the outside of the cryptographic key management device 120, thereby reducing the leakage risk.

The error correction encoding units 133 and 134 encode data in accordance with respective predetermined error correction encoding methods. The error correction encoding units 133 and 134 are used to generate a concealed cryptographic key. The error correction encoding methods used by the error correction encoding units 133 and 134 may be the same and may be different from each other. The error correction encoding unit 133 may use a linear code. For example, the error correction encoding unit 133 uses a linear code (n, $k_1$, $2d_1+1$). In this linear code, "n" indicates a bit length after encoding; "$k_1$" indicates a bit length before encoding; and "$d_1$" indicates the number of correctable bits. Also, the error correction encoding unit 134 uses a linear code or non-linear code ($k_2$, p, $2d_2+1$), for example. In this linear code, "$k_2$" indicates a bit length after encoding; "p" indicates a bit length before encoding; and "$d_2$" indicates the number of correctable bits. Here, $k_2$ is equal to or smaller than $k_1$.

The linear code is, for example, Hamming code, Bose Chaudhuri Hocquenghem (BCH) code, Reed-Solomon code, turbo code, low density parity check (LDPC) code, convolution code, or the like. The non-linear code is, for example, NR code, Nadra code, green code, or the like. A conceivable implementation example is n=2047, $k_1$=1023, $k_2$=511, and p=351, when both of the error correction encoding units 133 and 134 use the Reed-Solomon code. Also, a conceivable implementation example is n=8191, $k_1$=1535, $k_2$=1023, and p=223, when both of the error correction encoding units 133 and 134 use the BCH code.

The error correction decoding units 135 and 136 decode an error correction code in accordance with respective predetermined error correction encoding methods. The error correction decoding units 135 and 136 are used to restore a cryptographic key. The error correction decoding unit 135 corresponds to the error correction encoding unit 133, and the error correction decoding unit 136 corresponds to the error correction encoding unit 134. That is, the error correction decoding unit 135 is capable of decoding the error correction code generated by using the error correction encoding unit 133. The error correction decoding unit 136 is capable of decoding the error correction code generated by using the error correction encoding unit 134.

The random number generation unit 137 generates a random number that satisfies a predetermined condition. The random number generation unit 137 is used to generate a concealed cryptographic key. The Hamming weight of the random number generated by the random number generation unit 137, that is, the number of bits "1" is set equal to or smaller than the error correction capability (the number of correctable bits) of the error correction decoding unit 136. Note that the Hamming weight of the PUF code generated by the PUF circuit 132 is set to exceed the error correction capability (the number of correctable bits) of the error correction decoding unit 135. Also, the Hamming weight of the exclusive logical OR of two PUF codes generated by the PUF circuit 132 at different time points is set equal to or smaller than the error correction capability of the error correction decoding unit 135. That is, fluctuation of the PUF code does not exceed the error correction capability of the error correction decoding unit 135.

The encryption unit 124 acquires a cryptographic key and a plain text from the control unit 122, encrypts the plain text by using the acquired cryptographic key, and outputs the encrypted text to the control unit 122. The encryption unit 124 uses a predetermined symmetric key cryptography, such as the AES, as a cryptographic method. The cryptographic key acquired from the control unit 122 is a symmetric key of the predetermined symmetric key cryptography, such as a symmetric key of AES. After finishing the encryption, the encryption unit 124 does not retain but discards the cryptographic key and the plain text acquired from the control unit 122.

The decryption unit 125 acquires a cryptographic key and an encrypted text from the control unit 122, decrypts the encrypted text by using the acquired cryptographic key, and outputs a plain text to the control unit 122. The decryption unit 125 uses the same predetermined symmetric key cryptography as the encryption unit 124. After finishing decryption of the encrypted text, the decryption unit 125 does not retain but discards the cryptographic key acquired from the control unit 122 and the generated plain text.

Figure 5:
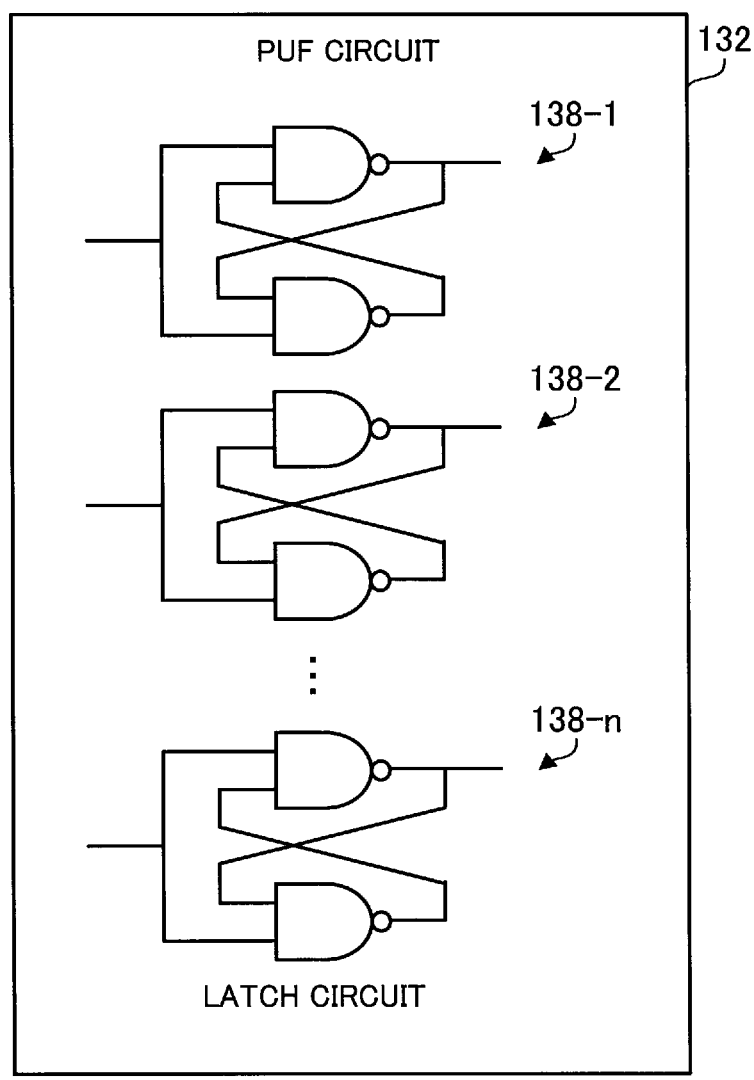
FIG. 5 illustrates an example of a physical unclonable function (PUF) circuit.

FIG. 5 illustrates an example of the PUF circuit. A method utilizing latch circuits is conceivable as an implementation method of the PUF circuit 132. For example, the PUF circuit 132 includes n (n is a non-negative integer indicating the number of bits of a PUF code) latch circuits 138-1, 138-2, . . . , 138-n. The n latch circuits correspond to n bits of the PUF code. The latch circuit 138-1 outputs the value of the least significant bit of the PUF code: The latch circuit 138-2 outputs the value of the second least significant bit of the PUF code. The latch circuit 138-n outputs the value of the most significant bit of the PUF code.

The latch circuits 138-1, 138-2, . . . , 138-n have the same structure. Each latch circuit includes two NAND circuits (a first NAND circuit and a second NAND circuit). The first NAND circuit includes a first input terminal to which an input signal is input from the outside of the latch circuit and a second input terminal to which an output signal of the second NAND circuit is fed back. Also, the first NAND circuit includes an output terminal for outputting an output signal. The output signal of the first NAND circuit is output to the outside of the latch circuit. The second NAND circuit includes a first input terminal to which the input signal is input from the outside of the latch circuit, and a second input terminal to which the output signal of the first NAND circuit is fed back. The first input terminal of the second NAND circuit receives the same input signal as the first input terminal of the first NAND circuit. Also, the second NAND circuit includes an output terminal for outputting an output signal.

When a predetermined input value (for example, "1") is input to the latch circuits 138-1, 138-2, . . . , 138-n, the output value of each latch circuit becomes logically unstable. However, the physical feature of each latch circuit, such as impurity density, decides a tendency that a specific output value is likely to be output (likelihood of outputting "1" and likelihood of outputting "0"), with respect to each latch circuit. Thus, the n-bit PUF code generated by using the latch circuits 138-1, 138-2, . . . , 138-n has a value basically unique to the PUF circuit 132. However, the output value of each latch circuit is logically unstable, and there is no guarantee that the output value is always constant. The PUF code does not vary largely but sometimes fluctuates within a certain range.

Figure 6:
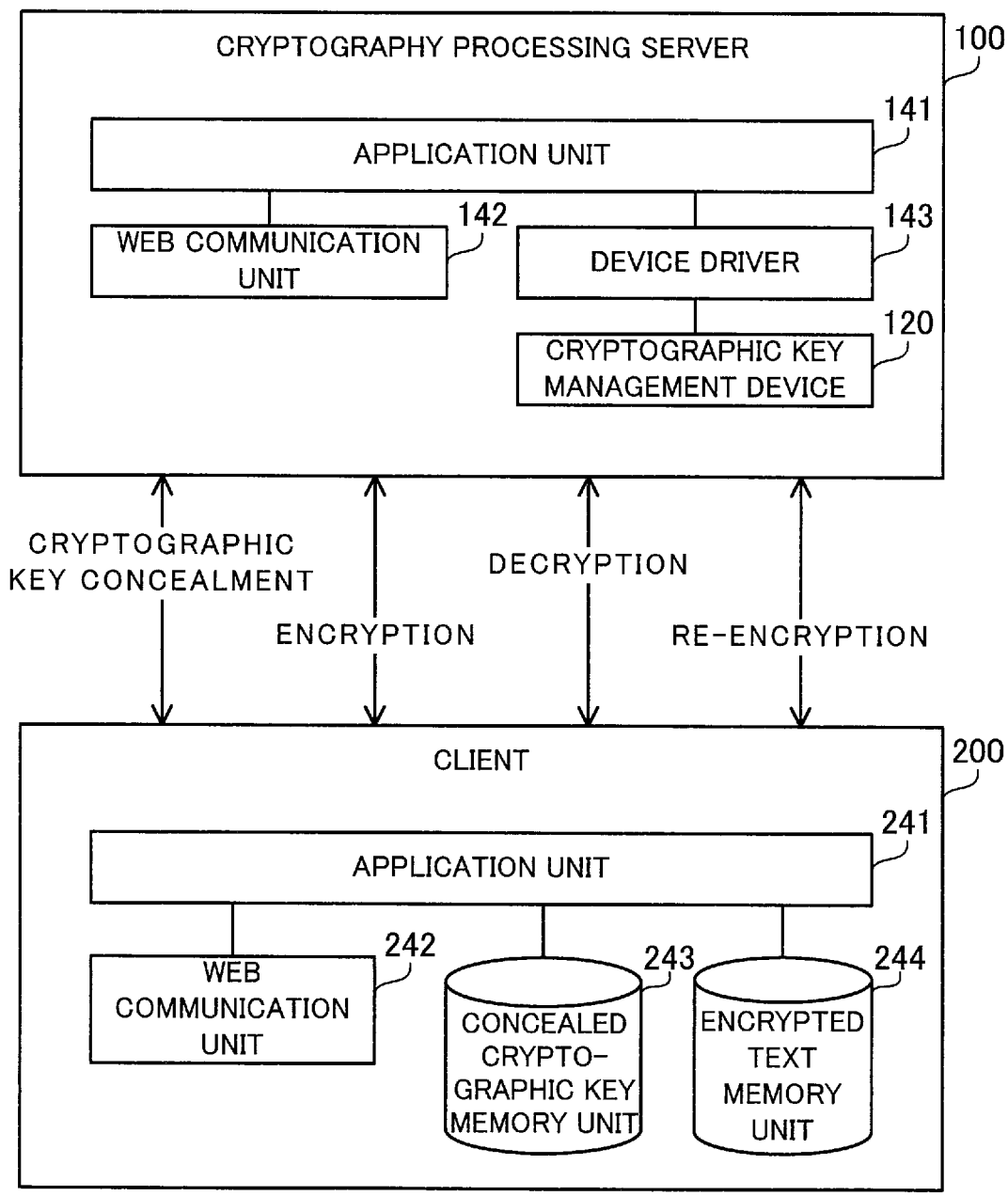
FIG. 6 is a block diagram illustrating a function example of a client and a cryptography processing server.

FIG. 6 is a block diagram illustrating a function example of a client and a cryptography processing server. The cryptography processing server 100 includes an application unit 141, a web communication unit 142, and a device driver 143. The application unit 141, the web communication unit 142, and the device driver 143 are implemented by using program modules, for example.

The application unit 141 is application software that provides a cryptography processing service for the clients 200, 200a, and 200b. The application unit 141 receives a request message from the clients 200, 200a, and 200b via the web communication unit 142. Then, the application unit 141 requests cryptography processing to the device driver 143 in accordance with the content of the request message and acquires a cryptography processing result from the device driver 143. The application unit 141 generates a response message from the cryptography processing result and transmits the response message to the clients 200, 200a, and 200b via the web communication unit 142.

The web communication unit 142 communicates with the clients 200, 200a, and 200b via the communication interface 107 and the network 30. The web communication unit 142 uses hypertext transfer protocol (HTTP) or internet protocol (IP) as a communication protocol. The web communication unit 142 receives an HTTP request message from the clients 200, 200a, and 200b and supplies the HTTP request message to the application unit 141. Also, the web communication unit 142 acquires an HTTP response message from the application unit 141 and transmits the HTTP response message to the clients 200, 200a, and 200b.

The device driver 143 is middleware for accessing the cryptographic key management device 120. The device driver 143 inputs a cryptography processing command to the cryptographic key management device 120 in accordance with a request from the application unit 141. The device driver 143 acquires a cryptography processing result from the cryptographic key management device 120 in response to the cryptography processing command and outputs the cryptography processing result to the application unit 141. The device driver 143 acquires a concealed cryptographic key in response to a cryptographic key concealment command. Also, the device driver 143 acquires an encrypted text in response to an encryption command. Also, the device driver 143 acquires a plain text in response to a decryption command. The device driver 143 acquires a new encrypted text in response to a re-encryption command.

The client 200 includes an application unit 241, a web communication unit 242, a concealed cryptographic key memory unit 243, and an encrypted text memory unit 244. The application unit 241 and the web communication unit 242 are implemented by using program modules, for example. The concealed cryptographic key memory unit 243 and the encrypted text memory unit 244 are implemented by using memory regions allocated in the RAM or the HDD, for example. The clients 200a and 200b are implemented with the same module configuration as the client 200.

The application unit 241 is application software that uses the cryptography processing service provided by the cryptography processing server 100. The application unit 241 generates a request message for requesting cryptography processing in accordance with the operation of a user who uses the client 200 and transmits the request message to the cryptography processing server 100 via the web communication unit 242. Then, the application unit 241 receives a response message including the cryptography processing result from the cryptography processing server 100 via the web communication unit 242.

When a new cryptographic key is prepared, the application unit 241 generates a request message representing a cryptographic key concealment request, for example. This request message includes a cryptographic key before concealment. The cryptographic key may be generated by the client 200 in accordance with predetermined algorithm and may be generated by other devices in accordance with predetermined algorithm. Also, a cryptographic key may be read into the client 200 from a portable storage medium and may be input to the client 200 by the user. The application unit 241 receives a response message including a concealed cryptographic key, as a result of the cryptographic key concealment request. The application unit 241 stores the concealed cryptographic key in the concealed cryptographic key memory unit 243. However, the concealed cryptographic key may be recorded in a portable storage medium and may be transmitted to another device. It is preferable that the application unit 241 does not retain but discards the original cryptographic key, after the concealment. Note that the cryptographic key may be supplied to the cryptography processing server 100 offline, as described above.

Moreover, when accepting user operation to encrypt data, the application unit 241 generates a request message representing encryption request. This request message includes a concealed cryptographic key and a plain text. The application unit 241 receives a response message including an encrypted text, as a result of the encryption request. The application unit 241 stores the encrypted text in the encrypted text memory unit 244. However, the application unit 241 may record the encrypted text in a portable storage medium and may transmit the encrypted text to another device. It is preferable that the application unit 241 does not retain but discards the unencrypted plain text.

When accepting user operation to view the encrypted text stored in the encrypted text memory unit 244, the application unit 241 generates a request message representing a decryption request. This request message includes a concealed cryptographic key and an encrypted text. The application unit 241 receives a response message including a plain text, as a result of the decryption request. The application unit 241 displays the plain text on the display of the client 200, for example. It is preferable that the application unit 241 does not retain but discards the plain text, after the user finishes viewing the plain text.

When accepting user operation to change a cryptographic key of an encrypted text, the application unit 241 generates a request message representing a re-encryption request. This request message includes a previous concealed cryptographic key before change, a new concealed cryptographic key after change, and a previous encrypted text encrypted by a previous cryptographic key. The new concealed cryptographic key is obtained from the cryptography processing server 100 in advance in accordance with the above cryptographic key concealment request. When encrypted data is stored for a long period, information security is improved by changing the cryptographic key periodically. The application unit 241 receives a response message including a new encrypted text encrypted by the new cryptographic key, as a result of the re-encryption request. The application unit 241 stores the new encrypted text in the encrypted text memory unit 244. In the re-encryption, a plain text is not supplied to the client 200.

The web communication unit 242 communicates with the cryptography processing server 100 via the network 30. The web communication unit 242 uses HTTP and IP as the communication protocol. The web communication unit 242 acquires an HTTP request message from the application unit 241 and transmits the HTTP request message to the cryptography processing server 100. Also, the web communication unit 242 receives an HTTP response message from the cryptography processing server 100 and supplies the HTTP response message to the application unit 241.

The concealed cryptographic key memory unit 243 stores the concealed cryptographic key supplied from the cryptography processing server 100. The concealed cryptographic key is concealed by using a PUF code generated by the PUF circuit 132, and thus the original cryptographic key is not restored from a concealed cryptographic key of a device other than the cryptographic key management device 120. The encrypted text memory unit 244 stores the encrypted text encrypted by the cryptography processing server 100. This encrypted text is encrypted by the cryptographic key corresponding to the concealed cryptographic key stored in the concealed cryptographic key memory unit 243. The encrypted text stored in the encrypted text memory unit 244 is not decrypted in a device other than the cryptographic key management device 120.

Figure 7:
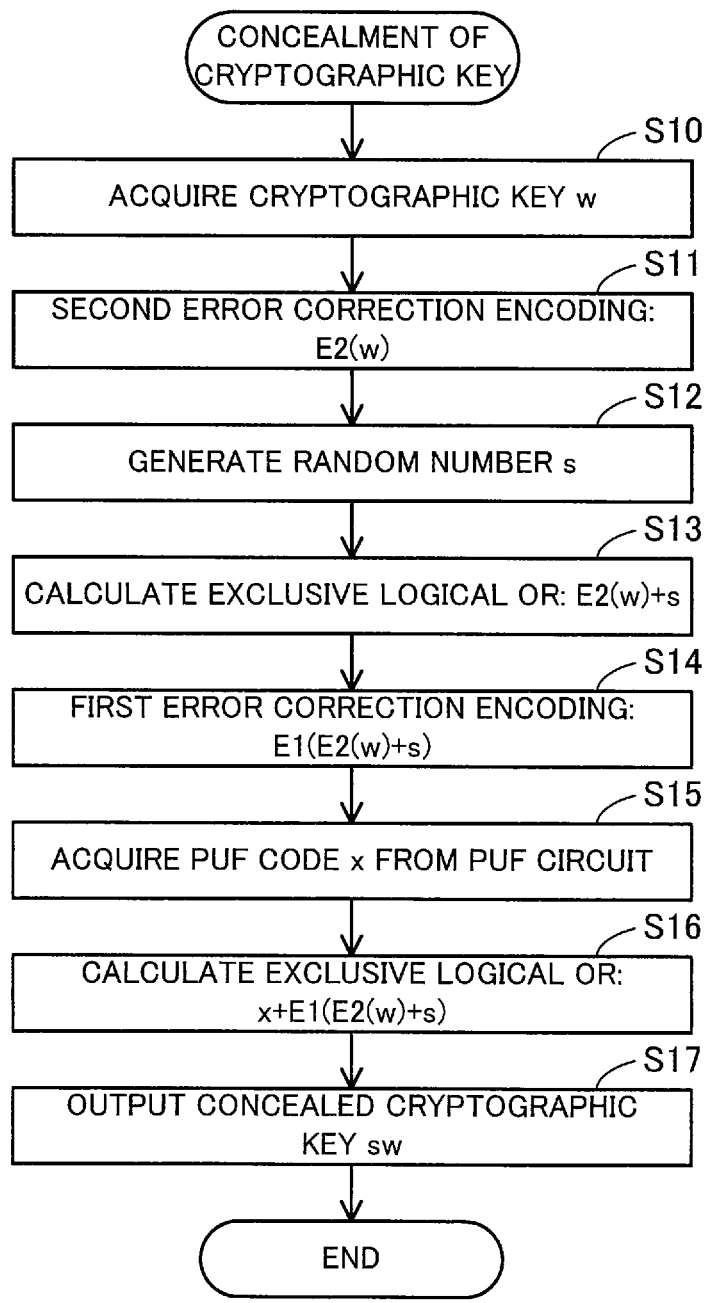
FIG. 7 is a flowchart illustrating a procedure example of cryptographic key concealment.

Next, the processing procedure of the cryptographic key management device 120 will be described. FIG. 7 is a flowchart illustrating a procedure example of cryptographic key concealment.

(S10) The input and output interface 121 receives a cryptographic key concealment command. The control unit 122 acquires a cryptographic key w attached to the cryptographic key concealment command. The control unit 122 inputs the cryptographic key w into the concealment processing unit 123.

(S11) The error correction encoding unit 134 encodes the cryptographic key w to generate E2(w).

(S12) The random number generation unit 137 generates a random number s.

(S13) The arithmetic-logic unit 131 calculates an exclusive logical OR of the error correction code E2(w) of step S11 and the random number s of step S12, in order to generate E2(w)+s.

(S14) The error correction encoding unit 133 encodes the calculation result of the exclusive logical OR of step S13, in order to generate E1(E2(w)+s).

(S15) The arithmetic-logic unit 131 acquires a PUF code x from the PUF circuit 132.

(S16) The arithmetic-logic unit 131 calculates an exclusive logical OR of the error correction code of step S14 and the PUF code x of step S15, in order to generate x+E1(E2(w)+s).

(S17) The control unit 122 acquires the calculation result of the exclusive logical OR of step S16, as a concealed cryptographic key sw, from the concealment processing unit 123. The input and output interface 121 acquires the concealed cryptographic key sw from the control unit 122 and transmits the concealed cryptographic key sw to the outside of the cryptographic key management device 120.

Figure 8:
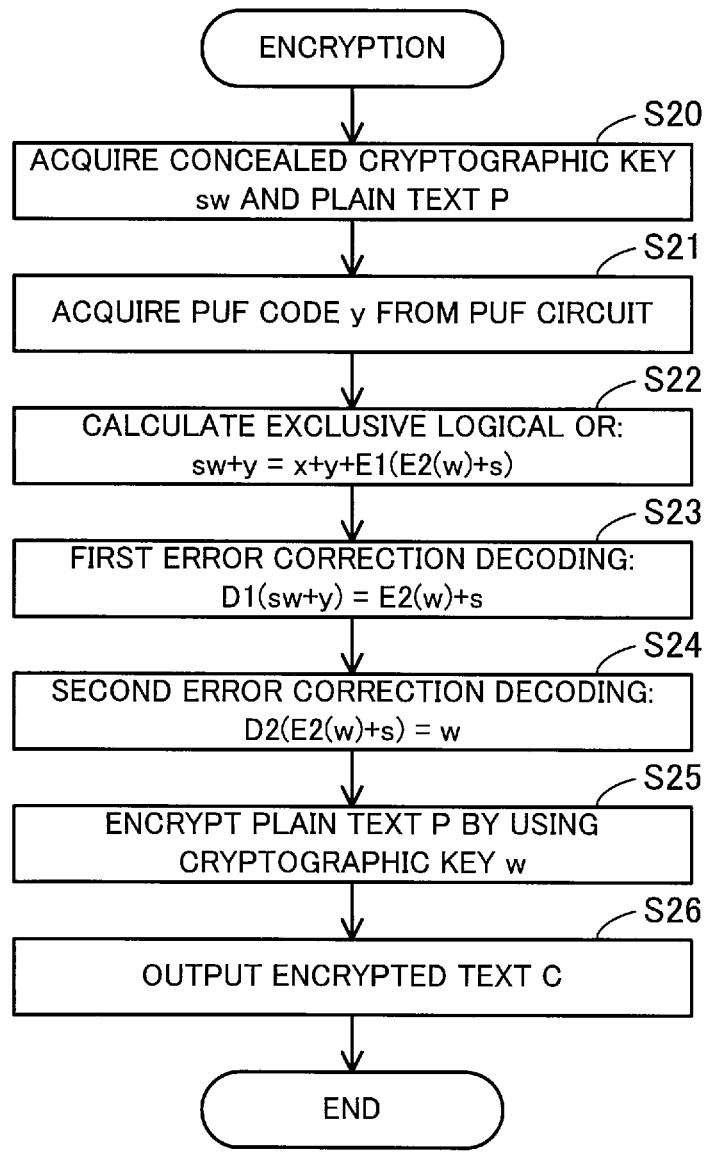
FIG. 8 is a flowchart illustrating a procedure example of encryption.

FIG. 8 is a flowchart illustrating a procedure example of encryption.

(S20) The input and output interface 121 receives an encryption command. The control unit 122 acquires a concealed cryptographic key sw and a plain text P attached to the encryption command. The control unit 122 inputs the concealed cryptographic key sw into the concealment processing unit 123.

(S21) The arithmetic-logic unit 131 acquires a PUF code y from the PUF circuit 132. The PUF code y acquired here is sufficiently similar to the PUF code x used to generate the concealed cryptographic key sw, but is not necessarily identical with the PUF code completely.

(S22) The arithmetic-logic unit 131 calculates an exclusive logical OR of the concealed cryptographic key sw of step S20 and the PUF code y of step S21, in order to generate sw+y. When the concealed cryptographic key sw is a valid concealed cryptographic key generated by the concealment processing unit 123, the calculation result of the exclusive logical OR is sw+y=x+y+E1(E2(w)+s).

(S23) The error correction decoding unit 135 decodes the calculation result of the exclusive logical OR of step S22, in order to generate D1(sw+y). When the concealed cryptographic key sw is the valid concealed cryptographic key generated by the concealment processing unit 123, the PUF code x and the PUF code y are sufficiently similar to each other, and thus the Hamming weight of x+y is equal to or smaller than the number of correctable bits of the error correction decoding unit 135. Thus, the decode result is D1(sw+y)=E2(w)+s.

(S24) The error correction decoding unit 136 further decodes the decode result of step S23, in order to generate D2(E2(w)+s). The Hamming weight of a random number s is equal to or smaller than the number of correctable bits of the error correction decoding unit 136, and thus the decode result is D2(E2(w)+s)=w.

(S25) The control unit 122 acquires the cryptographic key w restored in step S24 from the concealment processing unit 123 and inputs the cryptographic key w and the plain text P of step S20 into the encryption unit 124. The encryption unit 124 encrypts the plain text P by using the cryptographic key w, in order to generate an encrypted text C.

(S26) The control unit 122 acquires the encrypted text C generated in step S25 from the encryption unit 124. The input and output interface 121 acquires the encrypted text C from the control unit 122 and transmits the encrypted text C to the outside of the cryptographic key management device 120.

Note that, when the concealed cryptographic key sw is not a valid concealed cryptographic key generated by the concealment processing unit 123, the cryptographic key w is not restored correctly. The concealment processing unit 123 may report an error to the control unit 122, when determining that the decode result of step S24 does not correspond to the cryptographic key of a predetermined symmetric key cryptography. In that case, the control unit 122 may skip the encryption of the plain text P, and the input and output interface 121 may report an error to the outside.

Figure 9:
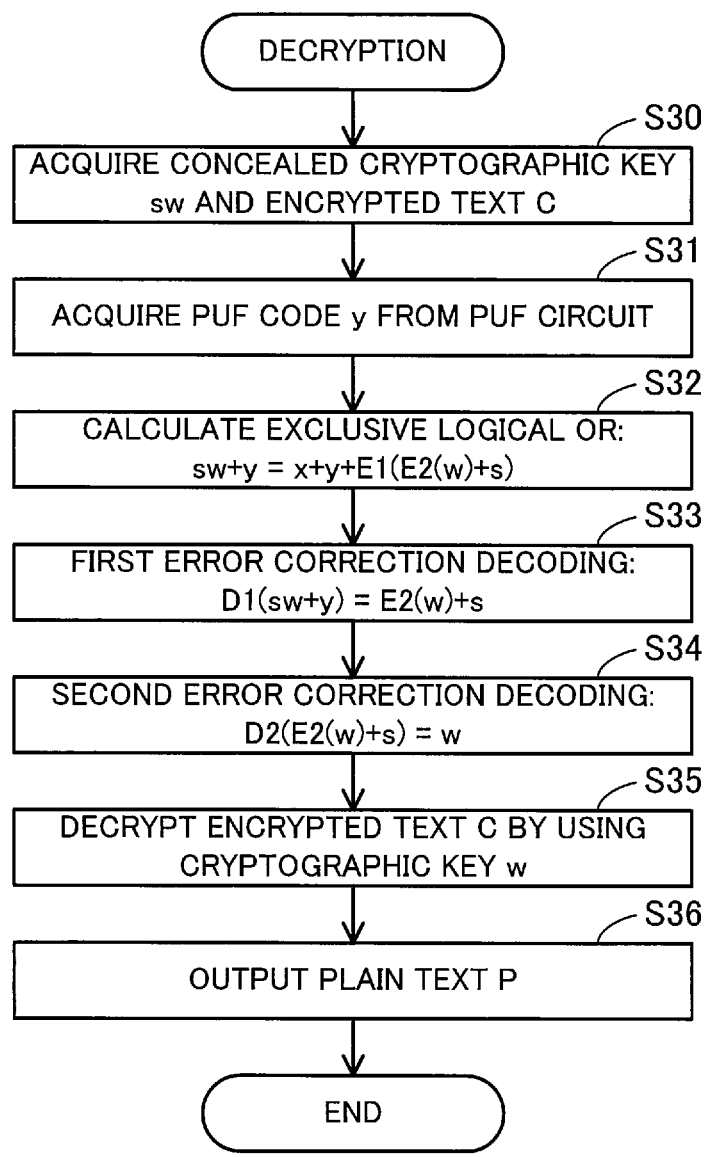
FIG. 9 is a flowchart illustrating a procedure example of decryption.

FIG. 9 is a flowchart illustrating a procedure example of encryption.

(S30) The input and output interface 121 receives a decryption command. The control unit 122 acquires a concealed cryptographic key sw and an encrypted text C attached to the decryption command. The control unit 122 inputs the concealed cryptographic key sw into the concealment processing unit 123.

(S31 to S34) The process in which the concealment processing unit 123 restores a cryptographic key w from the concealed cryptographic key sw is performed in the same way as aforementioned steps S21 to S24, and thus its description is omitted.

(S35) The control unit 122 acquires the cryptographic key w restored in step S34 from the concealment processing unit 123 and inputs the cryptographic key w and the encrypted text C of step S30 into the decryption unit 125. The decryption unit 125 decrypts the encrypted text C by using the cryptographic key w, in order to generate a plain text P.

(S36) The control unit 122 acquires the plain text P generated in step S35 from the decryption unit 125. The input and output interface 121 acquires the plain text P from the control unit 122 and transmits the plain text P to the outside of the cryptographic key management device 120.

Note that, when the concealed cryptographic key sw is not a valid concealed cryptographic key generated by the concealment processing unit 123, the cryptographic key w is not restored correctly. The concealment processing unit 123 may report an error to the control unit 122, when determining that the decode result of step S34 does not correspond to the cryptographic key of a predetermined symmetric key cryptography. In that case, the control unit 122 may skip the decryption of the encrypted text C, and the input and output interface 121 may report an error to the outside. When the encrypted text C is not encrypted by the valid cryptographic key w, the plain text P is not restored correctly from the encrypted text C. The decryption unit 125 may report an error to the control unit 122, when determining that the decryption result of step S35 is not the correct plain text. In that case, the input and output interface 121 may report an error to the outside.

Figure 10:
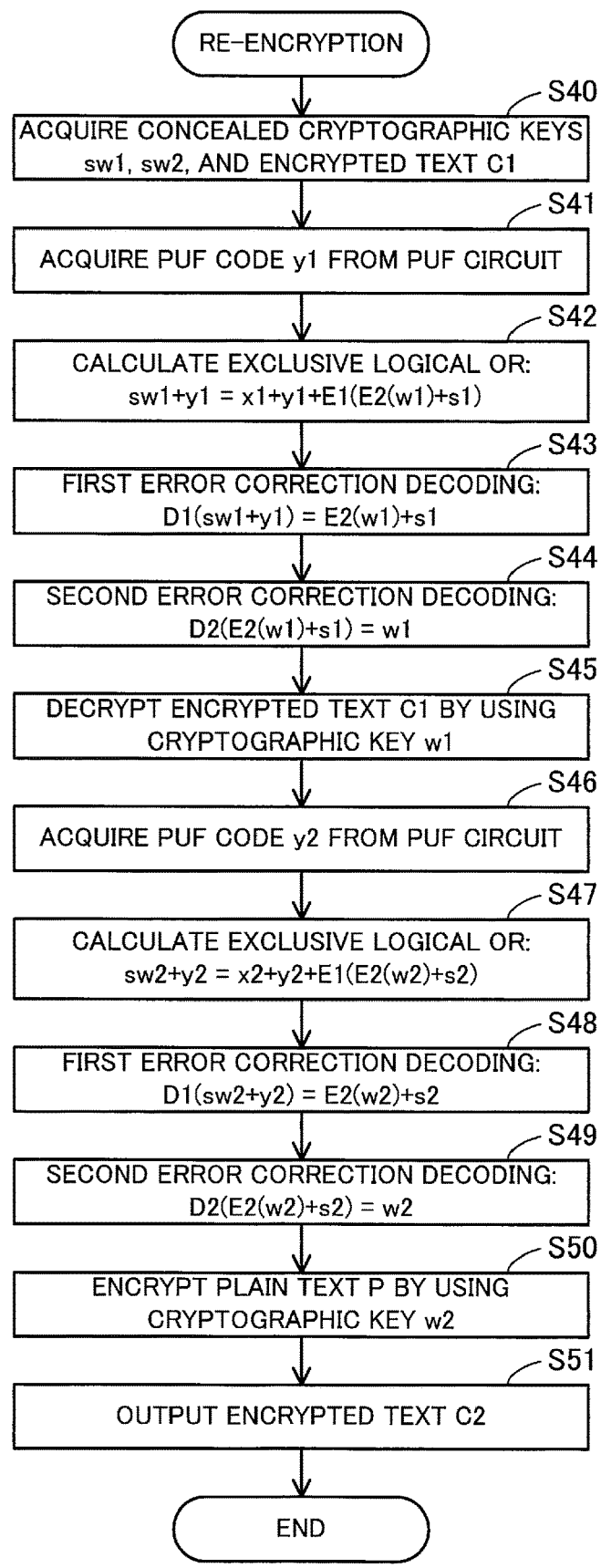
FIG. 10 is a flowchart illustrating a procedure example of re-encryption.

FIG. 10 is a flowchart illustrating a procedure example of re-encryption.

(S40) The input and output interface 121 receives a re-encryption command. The control unit 122 acquires concealed cryptographic keys sw1 and sw2 and an encrypted text C1 attached to the re-encryption command. The concealed cryptographic key sw1 is a previous concealed cryptographic key, and the concealed cryptographic key sw2 is a new concealed cryptographic key. The control unit 122 inputs the concealed cryptographic key sw1 into the concealment processing unit 123.

(S41) The arithmetic-logic unit 131 acquires a PUF code y1 from the PUF circuit 132. The PUF code y1 acquired here is sufficiently similar to the PUF code x1 used to generate the concealed cryptographic key sw1, but is not necessarily identical with the PUF code x1 completely.

(S42) The arithmetic-logic unit 131 calculates an exclusive logical OR of the concealed cryptographic key sw1 of step S40 and the PUF code y1 of step S41, in order to generate sw1+y1. When the concealed cryptographic key sw1 is a valid concealed cryptographic key generated by the concealment processing unit 123, the calculation result of the exclusive logical OR is sw1+y1=x1+y1+E1(E2(w1)+s1). Note that the PUF code x1 is the PUF code used to generate the concealed cryptographic key sw1, the cryptographic key w1 is the previous cryptographic key, and the random number s1 is the random number used to generate the concealed cryptographic key sw1.

(S43) The error correction decoding unit 135 decodes the calculation result of the exclusive logical OR of step S42, in order to generate D1(sw1+y1). When the concealed cryptographic key sw1 is the valid concealed cryptographic key generated by the concealment processing unit 123, the PUF code x1 and the PUF code y1 are sufficiently similar to each other, and thus the Hamming weight of x1+y1 is equal to or smaller than the number of correctable bits of the error correction decoding unit 135. Thus, the decode result is D1(sw1+y1)=E2(w1)+s1.

(S44) The error correction decoding unit 136 further decodes the decode result of step S43, in order to generate D2(E2(w1)+s1). The Hamming weight of the random number s1 is equal to or smaller than the number of correctable bits of the error correction decoding unit 136, and thus the decode result is D2(E2(w1)+s1)=w1.

(S45) The control unit 122 acquires the cryptographic key w1 restored in step S44 from the concealment processing unit 123 and inputs the cryptographic key w1 and the encrypted text C1 of step S40 into the decryption unit 125. The decryption unit 125 decrypts the encrypted text C1 by using the cryptographic key w1, in order to generate a plain text P. Also, the control unit 122 inputs the concealed cryptographic key sw2 into the concealment processing unit 123.

(S46) The arithmetic-logic unit 131 acquires a PUF code y2 from the PUF circuit 132. The PUF code y2 acquired here is sufficiently similar to the PUF code x2 used to generate the concealed cryptographic key sw2, but is not necessarily identical with the PUF code x2 completely.

(S47) The arithmetic-logic unit 131 calculates an exclusive logical OR of the concealed cryptographic key sw2 of step S40 and the PUF code y2 of step S46, in order to generate sw2+y2. When the concealed cryptographic key sw2 is a valid concealed cryptographic key generated by the concealment processing unit 123, the calculation result of the exclusive logical OR is sw2+y2=x2+y2+E1(E2(w2)+s2). Note that the PUF code x2 is the PUF code used to generate the concealed cryptographic key sw2, the cryptographic key w2 is the new cryptographic key, and the random number s2 is the random number used to generate the concealed cryptographic key sw2.

(S48) The error correction decoding unit 135 decodes the calculation result of the exclusive logical OR of step S47, in order to generate D1(sw2+y2). When the concealed cryptographic key sw2 is the valid concealed cryptographic key generated by the concealment processing unit 123, the PUF code x2 and the PUF code y2 are sufficiently similar to each other, and thus the Hamming weight of x2+y2 is equal to or smaller than the number of correctable bits of the error correction decoding unit 135. Thus, the decode result is D1(sw2+y2)=E2(w2)+s2.

(S49) The error correction decoding unit 136 further decodes the decode result of step S48, in order to generate D2(E2(w2)+s2). The Hamming weight of the random number s2 is equal to or smaller than the number of correctable bits of the error correction decoding unit 136, and thus the decode result is D2(E2(w2)+s2)=w2.

(S50) The control unit 122 acquires the cryptographic key w2 restored in step S49 from the concealment processing unit 123 and inputs the cryptographic key w2 and the plain text P of step S45 into the encryption unit 124. The encryption unit 124 encrypts the plain text P by using the cryptographic key w2, in order to generate an encrypted text C2.

(S51) The control unit 122 acquires the encrypted text C2 generated in step S50 from the encryption unit 124. The input and output interface 121 acquires the encrypted text C2 from the control unit 122 and transmits the encrypted text C2 to the outside of the cryptographic key management device 120.

According to the cryptographic key management device 120 of the second embodiment, a concealed cryptographic key is generated by using a PUF code generated by the PUF circuit 132 which is difficult to read from the outside, and at the time of cryptography processing a cryptographic key is temporarily restored from the concealed cryptographic key inside the cryptographic key management device 120. Thus, the risk of leaking the cryptographic key is reduced, and the protection of the cryptographic key is enhanced. As a result, information security of the encrypted text that may be decrypted by using the cryptographic key is enhanced, and the leakage risk of the plain text is reduced. Further, when the cryptographic key is changed, the encrypted text is decrypted and re-encrypted in such a manner that the plain text is not output to the outside of the cryptographic key management device 120. Thus, it becomes easy to change the cryptographic key, and the information security of the data stored for a long term is enhanced.

Moreover, a mask process is performed to a concealed cryptographic key by using a hardware dependent PUF code, and thus it is difficult to restore a cryptographic key from the concealed cryptographic key by a device other than the cryptographic key management device 120. Furthermore, a mask process is performed to the concealed cryptographic key by using a random number selected at the time of generation of the concealed cryptographic key, and thus even if the cryptographic key is leaked due to mismanagement or the like, it is difficult to guess the PUF code of the cryptographic key management device 120 from the concealed cryptographic key and the original cryptographic key. Thus, the cryptographic key management device 120 is operated stably.

In one aspect, protection of a cryptographic key is enhanced.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A key generation device comprising:
a generation circuit configured to generate a physical unclonable function (PUF) value;
a first processing circuit configured to
acquire a cryptographic key,
perform a first error correction encoding method to generate first data by encoding the cryptographic key,
generate second data by performing a first mask process to the first data by using a random number,
perform a second error correction encoding method to generate third data by encoding the second data,
acquire a first PUF value generated by the generation circuit,
generate a concealed cryptographic key by performing a second mask process to the third data by using the first PUF value,
acquire the concealed cryptographic key,
acquire a second PUF value generated by the generation circuit after the first PUF value,
generate fourth data by performing a third mask process to the concealed cryptographic key by using the second PUF value,
perform a first error correction decoding method corresponding to the second error correction encoding method to generate fifth data by decoding the fourth data, the first error correction decoding method removing a difference between the first PUF value and the second PUF value from the fourth data, and
perform a second error correction decoding method corresponding to the first error correction encoding method to reproduce the cryptographic key by decoding the fifth data, the second error correction decoding method removing the random number from the fifth data; and a second processing circuit configured to, when acquiring the concealed cryptographic key and a plain text or an encrypted text, acquire the reproduced cryptographic key corresponding to the concealed cryptographic key from the first processing circuit, and encrypt the plain text or decrypt the encrypted text by using the reproduced cryptographic key.

2. The key generation device according to claim 1, wherein when acquiring the concealed cryptographic key, another concealed cryptographic key, and the encrypted text, the second processing circuit acquires the reproduced cryptographic key corresponding to the concealed cryptographic key from the first processing circuit, decrypts the encrypted text by using the cryptographic key, acquires another cryptographic key corresponding to the another concealed cryptographic key from the first processing circuit, and re-encrypts a decryption result of the encrypted text by using the another cryptographic key.

3. A key generation method comprising:

acquiring, by a key generation device, a cryptographic key;

performing, by the key generation device, a first error correction encoding method to generate first data by encoding the cryptographic key;

generating, by the key generation device, second data by performing a first mask process to the first data by using a random number;

performing, by the key generation device, a second error correction encoding method to generate third data by encoding the second data;

acquiring a first PUF (Physical Unclonable Function) value generated by a generation circuit in the key generation device;

generating, by the key generation device, a concealed cryptographic key by performing a second mask process to the third data by using the first PUF value;

acquiring, by the key generation device, the concealed cryptographic key and a plain text or an encrypted text;

acquiring a second PUF value generated by the generation circuit after the first PUF value;

generating, by the key generation device, fourth data by performing a third mask process to the concealed cryptographic key by using the second PUF value;

performing, by the key generation device, a first error correction decoding method corresponding to the second error correction encoding method to generate fifth data by decoding the fourth data, the first error correction decoding method removing a difference between the first PUF value and the second PUF value from the fourth data;

performing, by the key generation device, a second error correction decoding method corresponding to the first error correction encoding method to reproduce the cryptographic key by decoding the fifth data, the second error correction decoding method removing the random number from the fifth data; and encrypting the plain text or decrypting the encrypted text, by the key generation device, by using the reproduced cryptographic key.

\* \* \* \* \*